United States Patent Office 3,149,977
Patented Sept. 22, 1964

3,149,977
PROCESS FOR ROASTING COFFEE
Robert R. Baldwin, Briarcliff Manor, John R. Lowry, Dobbs Ferry, and William J. Ohan, Jr., New City, N.Y., assignors to General Foods Corporation, White Plains, N.Y., a corporation of Delaware
No Drawing. Filed June 16, 1961, Ser. No. 117,494
14 Claims. (Cl. 99—71)

This invention relates to a method of preparing coffee and cocoa products which are possessed by the application of heat to cause desirable characteristics such as preservation stability, improved flavor, or improved color to occur. This application is a continuation-in-part of Serial No. 681,181, filed August 30, 1957, and Serial No. 795,331, filed February 25, 1959, now both abandoned.

One of the reactions occurring to cause this when food is heated is the Maillard reaction, known generally as the browning reaction. The mechanism of this reaction is not known, but it is believed to consist of a reaction or series of reactions between a carbohydrate or a carbohydrate containing substance and an amino-group containing substance to form a complex product, usually brown in color, which in turn gives the general name to the reaction. The nature of the complex product is not known, but there are generally various types of browning reactions, classified as follows:

(1) Carbohydrates and amino compounds other than amino acids;
(2) Carbohydrates and amino acids;
(3) Carbohydrates and polypeptides or proteins.

Carbohydrates which will react in accordance with the browning reaction include glucose, fructose, mannose, galactose, rhamnose, arabinose, xylose, sucrose, maltose, lactose, cellobiose, raffinose, gentibiose, melibiose, glucosamine, and starch, while among the amino acids which react are glycine, alanine, serine, threonine, valine, leucine, aspartic acid, glutamic acid, hydroxy glutamic acid, arginine, lysine, cystine, methionine, phenylalanine, tyrosine, histidine, tryptophan, proline, and hydroxyproline. Proteins which will react include albumins, globulines, prolamins, glutelins, albuminoids, histones, protamines, nucleoproteins, lipoproteins, glycoproteins, and phosphoproteins.

It has long been recognized that along with the advantages disclosed above, there existed disadvantages to the processing of foods by heat to cause this reaction to occur. Some of these disadvantages are a loss of volatile material and deleterious changes in the nutritive value of the processed food. A serious problem therefore existed in the desire to have the benefits of the browning reaction, without having the side effects, which were always found to be necessary and present. The use of less heat was found to minimize the undesirable side effects, but at the same time, the desirable reaction would not occur to the extent needed.

It is an object of this invention to provide a method which will enable the reaction to proceed to the desired extent in coffee and cocoa, while at the same time eliminating the unwanted losses of valuable nutrients, and thus benefiting the coffee and cocoa processing industries, since more edible coffee or cocoa will be recovered from each unit amount of coffee or cocoa produced.

It is an object of this invention to provide a technique for extraction of coffee solubles under conditions which are conducive to high over-all extraction rate and lower pressure drop. Other objects will be apparent to those skilled-in-the-art on inspection of the specification.

It has now been discovered that the objects of the present invention may be obtained by treating green coffee beans or unroasted cacao beans with ionizing penetrating radiation at a dose of $5 \times 10^5$ rep to $9 \times 10^6$ rep and heating the irradiated beans for a time and at a temperature sufficient to complete roasting. While $5 \times 10^5$ rep to $1 \times 10^6$ rep produces satisfactory results in accordance with the present invention, it is preferred to employ $1 \times 10^6$ rep to $9 \times 10^6$ rep.

According to certain of the aspects of this invention, it has now been found that the treatment of coffee or cocoa which is to undergo the browning reaction, by ionizing penetrating radiation, in conjunction with the application of heat, will substantially lessen the amount of heat needed to produce the required browning change.

The ionizing penetrating radiation which can be employed to give the desired product of this invention includes beta and gamma rays. Beta rays include cathode rays, the former term being the common designation when the rays originate from a naturally or artificially radioactive source, while the latter designation is commonly employed to indicate rays produced in an electrical apparatus, e.g., of the vacuum tube type. Beta rays and electron beams are particulate in character, while gamma rays and X-rays are electromagnetic.

The term gamma rays, as used herein, is intended to include therewithin X-rays. The term "gamma" is commonly employed when the rays originate from a naturally or artificially radioactive source, while the term "X-ray" is commonly used when the rays are continuously produced by electron bombardment of suitable targets in an appropriate apparatus. Gamma radiation sources which may be used include cobalt 60, europium 152, europium 154, cesium 134, barium 137, antimony 124, silver 110, iron 59, tantalum 182, zinc 56, rubidium 86, scandium 46, niobium 95, and zirconium 95. Beta radiation was administered in a linear accelerator.

The ionizing penetrating radiation which can be used in the process of this invention is that having an energy falling within the range of $10^{-3}$ mev. (million electron volts) up to about 15 mev.; when the preferred type of radiation, i.e., gamma radiation including X-ray radiation, is employed, the energy thereof will typically fall in the range of $10^{-3}$ mev. up to about 2.5 mev. Typically the wave length of the preferred gamma radiation will be within the range of 0.01 up to about 14 Angstrom units; the frequency may range from about $10^{18}$ up to about $10^{21}$ per second.

It has been found that gamma rays emitted by radioactive atoms, particularly atoms which have been artificially rendered radioactive by bombardment thereof with e.g., neutrons, are particularly suitable for use in connection with this invention. When gamma radiation from such a source is used, the preferred energy ranges of the gamma particles are those falling within the range of $8.8 \times 10^{-3}$ mev. up to 2.5 mev. The wave length of these gamma rays is 0.01 Angstrom unit to about 14 Angstrom units. The frequencies may range from e.g. $0.3 \times 10^{19}$ up to $0.3 \times 10^{21}$ per second.

Cobalt 60 is prepared, e.g., by irradiating normal cobalt of atomic weight 59 in a uranium pile wherein neutrons are present. As a neutron strikes an atom of cobalt 59, it forms the artifically radioactive cobalt 60 which emits gamma radiation having an energy of 1.1 and 1.3 mev. The half-life of cobalt 60 is 5.3 years.

Practice of the present invention may be more fully understood by reference to the following detailed description of experiments indicating how the desirable results may be obtained. In these experiments, the radiation employed is measured in terms of the rep (i.e., Roentgen equivalent physical). A rep is a measure of the amount of radiation falling on a particular material, and is measured by determining the effect upon a standard such as the commonly used methylene blue indicator, located immediately adjacent to the sample being irradiated. At the conclusion of the radiation experiment, the number of rep's supplied to the substance can be determined by comparing the irradiated methylene blue with a standard non-irradiated methylene blue sample.

COFFEE

In accordance with the prior discussion, the ionizing penetrating radiation is used to modify the roast temperature of green coffee, as will follow.

The coffee bean is the seed of the coffee tree. "Coffee" refers to the seeds of a rubiaceous shrub (*Coffea arabica, Coffea liberica, Coffea robusta,* and other species of Coffea). Coffee, as used by the consumer, is processed by roasting the bean to develop the aroma and flavor which is associated with coffee, followed by grinding before sale to the consumer. The green coffee bean has no odor and no taste which has been found attractive for human consumption. The roasting of coffee is therefore a necessary intermediate step in the preparation of coffee for ultimate sale to the consumer. The usual roasting temperature ranges from 200° C. to 230° C. and the roast is continued for approximately fifteen minutes.

However, this very roasting step which produces the article which is of value in commerce, also volatilizes a large amount of the valuable material, due to the high roast temperatures which must be used in order to produce the desired flavor and color. It is readily apparent, then, that any means of lessening the roasting while maintaining the desired flavor and color would result in appreciable savings. The flavor of roasted coffee depends on the time of the roast and also the intensity of the heat used. There have been various attempts to obtain suitable flavor by use in roasting of lower roasting temperatures or shorter time periods. However, as is well known to those skilled-in-the-art, in order to produce a coffee acceptable to the consumer, if one of the two variables were lowered, the other had to be raised proportionately, in order to deliver the same quantity of heat to the beans. Such attempts have been unsuccessful in solving the basic problem of minimizing the wastage inherent in the roasting method.

This invention therefore provides a process for producing roasted coffee under conditions such that the quantity of heat supplied to the beans is lessened, and roasting is effected at a lower roast temperature, while maintaining the length of roast exposure, or for a shorter time, while maintaining the usual roast temperatures.

According to certain of the aspects of this invention, coffee beans may be roasted at low temperatures and for short times to produce a roasted coffee bean characterized by desirable flavor and color, by the process which comprises heating coffee beans and subjecting said coffee beans to ionizing penetrating radiation before said roasted coffee is produced.

According to one aspect of this invention, the weight loss of desirable volatile coffee aroma constituents of the coffee beans after roasting is lessened. Further, less fuel is consumed in the process of roasting. In addition, the amount of soluble solids which can be extracted from the coffee beans is increased. Further, the caffein loss due to volatilization is decreased. It will thus be apparent that the process of this invention will result in a superior coffee product, and further result in substantial savings in equipment, due to its longer useful life period when operated at lower temperatures.

Although the particular details of treatment of the coffee by radiation will vary depending upon the condition of the coffee and the type of radiation used, it is found that satisfactory results can be obtained by operating at atmospheric pressure and at ambient coffee temperatures, although it is preferred to employ temperatures ranging from 50° up to 70° F. The distance between the radiation source and the coffee being irradiated may vary, but typically it will be of the order of from 1 inch up to about 18 inches. Under these conditions irradiation may occur for a period ranging from about 5 seconds up to as long as 18 hours. In the case of beta radiation, the time may be as little as 5 seconds and the preferred maximum will not be above 15 minutes. In the case of gamma radiation the preferred range is ½ hour to 18 hours, with best results being obtained after about 3–8 hours. While the radiation dosage employed may range from $5 \times 10^5$ to $9 \times 10^6$ rep, it is preferred to employ a dosage of $1 \times 10^6$ to $9 \times 10^6$ rep.

It is therefore seen that our discovery encompasses a method of roasting coffee beans by a combination of irradiation exposure plus heat treatment, which treatment produces coffee beans which are the full equivalent of roasted beans produced by heat only in both flavor of the beverage produced and color of the bean. Roasting of coffee beans by irradiation alone was attempted, but the result was not satisfactory, in that there was no consistency of roasted bean possible. Some beans were under-roasted, while others were over-roasted. It is therefore seen that best results will be obtained by irradiating within the above discussed limits, followed by roasting for five to six minutes at temperatures of 200° to 220° C. The irradiation of the coffee beans may either take place loose, that is, unpackaged, or they may be placed in containers of any sort. We have used cans, the metal of which does not produce undesirable side effects. The beans may be irradiated in air, but also may be treated in an inert gaseous atmosphere, such as nitrogen or carbon dioxide.

Green coffee beans were loaded into a No. 10 can, which fits into the center well of a cobalt 60 source (a primary gamma radiation source) and the can of coffee beans is introduced into a wire mesh cap, subsequent to which operation the source of radiation is raised to a position surrounding the can. In this position the dose rate is 500,000 rep per hour and the sample remains for sufficient time to obtain a dose required. Varying dosages, ranging from $1 \times 10^6$ rep to $9 \times 10^6$ rep were administered, although most of the runs were carried out with coffee beans irradiated with $4 \times 10^6$ rep, the optimum determined dosage. Below $1 \times 10^6$ rep, the increase in soluble solids and extractability is not as appreciable. Thereafter, the cans were removed and roasted at varying temperatures for differing times, as shown in the following tables by the following method. Before the insertion of the beans into the roaster, the roaster had reached at least 220° C., and a thermometer is immersed in the bed of beans. A stop watch is started immediately after the thermometer is immersed. The beans then roast either to a desired time or to a desired temperature, and are then transferred to a tray, where they are cooled to room temperature with an electric fan, and then are weighed to obtain roasting loss. This roasting loss figure is then calculated on a dry basis to rule out any difference in starting moisture of the beans from batch to batch.

*Sample Calculation*

100 g. starting material
10% initial moisture in green beans
88 g. (weight after roasting)

Thus, 100−10=90 g. green coffee (starting material) on dry basis

90−88=2 g. (roasting loss)

The color of the coffee as measured with a spectrophotometer, after grinding, gave values for roast color.

Color indices are numerical expressions of the color of the finished roast, the higher numbers indicating a deeper brown color is reached with application of equivalent amount of heat. Therefore irradiated samples do not require as much heat in subsequent roasting.

A series of roasts were made using green coffee samples which had been irradiated at differing levels. Table I shows that the color darkens as the irradiation dose increases, the time of roast remaining constant in each series.

TABLE I.—EFFECT OF IRRADIATION DOSE ON FINAL ROAST COLOR

| Exp. | Run | Dose | Temp., °C. | Time | Color |
|---|---|---|---|---|---|
| I | 1 | 0 | 210 | 9' | 1785 |
|  | 2 | 0 | 210 | 9'10'' | 1850 |
|  | 3 | $1 \times 10^6$ | 210 | 9' | 2330 |
|  | 4 | $4 \times 10^6$ | 210 | 9' | 2600 |
|  | 5 | $9 \times 10^6$ | 210 | 9' | 3080 |
| II | 1 | 0 | 210 | 9'18'' | 1565 |
|  | 2 | 0 | 210 | 9'18'' | 1495 |
|  | 3 | $1 \times 10^6$ | 210 | 9'18'' | 1835 |
|  | 4 | $4 \times 10^6$ | 210 | 9'18'' | 2100 |
|  | 5 | $9 \times 10^6$ | 210 | 9'18'' | 2330 |
| III | 1 | 0 | 210 | 5'42'' | 1380 |
|  | 2 | $4 \times 10^6$ | 207 | 5'30'' | 1360 |

Examples I and II are gamma irradiated, while Example III is beta irradiated, and the irradiated sample was roasted to a lower end temperature.

The roasting was performed in a Preedit Roaster in 100 gram lots. This roaster comprises a rotatable drum, heated by a resistance wire arranged about the periphery of the drum to supply uniform thermal heat and uniformity of roasting is further assured by the tumbling action of the drum. The drum is open to the atmosphere and temperature measurements are made by means of a thermometer inserted into the tumbled mass of coffee beans.

When roasting to final color, the weight of the irradiated coffee beans was markedly greater for the irradiated beans, as shown in Table II, when corrected to reflect the percent moisture in the beans. A tolerance of thirty-five in the roast color number is permissible, and accordingly, comparisons have been made on this basis, with the control percentage loss calculated as 100%, and sample 1 being compared with sample 2, the average of samples 3 and 4 with the average of 5 and 6, and sample 7 compared with 8.

ble coffees, the amount of material extracted from the bean may be about 30% which is obtained from (a) soluble solids and (b) autoclaved solids which may only be extracted at higher temperature and pressure. The autoclaved solids are the less desirable component of the extract and as the percentage of these increases, the taste of the product becomes less satisfactory. In accordance with the above data, it may be possible to produce from the irradiated material a 30% extract containing e.g. 27.12% soluble solids and 2.88% autoclaved solids; the control sample would give a 30% extract containing 25.68% soluble solids and 4.32% autoclaved solids. Thus the autoclaved solids are at least 32% less in the soluble coffee obtained by the process of this invention and this may be in part responsible for the consistently superior flavor of the product of this invention.

The irradiated roasted coffee bean will preferably be ground, e.g. in a Hobart-type grinder to produce particles typically of about 8–20 mesh size. More specifically a typical particle size distribution of the ground coffee may be as follows:

30% to 55%, say 46.5% on 8-mesh
40% to 60%, say 50% on 20-mesh
2% to 4%, say 3.5% through 20-mesh It is a feature of this invention that it is possible to grind the irradiated roasted coffee to a given average particle size under conditions such that the amount of undesirable fines concurrently produced may be reduced by as much as 75%–80%; this permits operation of the hereinafter described extraction unit with lower pressure drop, lower solids carry-over, etc.

These coffee particles may be placed within an appropriate extraction zone or vessel, typically a tall extraction column, in a bed which may have a depth of 15 feet to 20 feet. Aqueous extraction liquor, typically water, may be passed upwardly (or downwardly) through the bed. Under the preferred conditions of operation, hot water, having a temperature of at least about 175° F.–190° F.

TABLE II.—TABULATION OF ROASTING DATA FROM EXPERIMENTS WITH MODIFIED PREEDIT ROASTER

| No. | Type and amount of Radiation | Temp., °C. | Roast Color | Wt. after Roasting | Percent Moisture | Corr. Wt.[1] | Roasting Loss | Percent Loss |
|---|---|---|---|---|---|---|---|---|
| 1 | Gamma, $4 \times 10^6$ | 208 | 1242 | 91.3 | 8.14 | 91.80 | 0.56 | 66 |
| 2 | 0 | 210 | 1212 | 92.5 | 6.66 | 93.34 | 0.84 | 100 |
| 3 | Gamma, $4 \times 10^6$ | 212 | 1480 | 90.3 | 8.14 | 91.80 | [2] 1.56 | 72 |
| 4 | Gamma, $4 \times 10^6$ | 212 | 1460 | 90.4 | 8.14 | 91.80 | [2] 1.46 | 72 |
| 5 | 0 | 215 | 1460 | 91.3 | 6.66 | 93.34 | [3] 2.04 | 100 |
| 6 | 0 | 215 | 1460 | 91.2 | 6.66 | 93.34 | [3] 2.14 | 100 |
| 7 | Beta, $4 \times 10^6$ | 207 | 1361 | 89.0 | 10.55 | 89.45 | 0.45 | 58 |
| 8 | 0 | 210 | 1380 | 88.5 | 10.73 | 89.27 | 0.77 | 100 |

[1] On dry basis.
[2] Average 1.51.
[3] Average 2.09.

In the above work, 100 gram samples were used for the roasting, and the loss due to roasting was calculated as 100% for the control, non-irradiated sample, while the percentage loss shows the percentage loss of the irradiated sample as compared to the control.

The soluble solids capable of being extracted from roasted coffee is shown by the following table, when roasted to 212° C.

TABLE III.—DATA ON SOLUBLE SOLIDS OF ROASTED COFFEE

| Dose (rep) | Color | Soluble Solids | Percent Increase |
|---|---|---|---|
| 0 | 1460 | 25.68 |  |
| $4 \times 10^6$ Gamma | 1460 | 27.12 | 5.5 |

The increase in soluble solids from 25.68% to 27.12% is very significant. In the commercial extraction of soluwill be employed to extract coffee solubles. It is a feature of this invention that when the coffee, treated as hereinbefore indicated, is contacted with hot water, the pressure drop across the column of coffee is low and the rate of passage through the coffee is high. This may be demonstrated by the following wherein Examples I and II serve as controls and Examples III as a specific illustrative example of the invention.

I—Green
II—Roasted
III—Irradiated[1] roasted

[1] With $6 \times 10^6$ rep of beta radiation from a 4 mev. linear accelerator.

Each sample was ground in a Hobart grinder having a fixed setting directed to obtaining about 50% retention on 20-mesh. Each ground sample was sieved to separate out the material larger than 8-mesh and finer than 20-mesh and the through 8-mesh on 20-mesh portion was placed in an extraction column and contacted with 2.5 times its weight of 200° F.–210° F. water by placing the water on top of the coffee column and permitting it to pass through under the influence of gravity. The water which passed through the column was recirculated back to the column at the same temperature. The following results were noted:

In the cases of samples I and II, the non-irradiated samples, the water passed through on the first pass rather quickly. On the second pass, with the same liquor, the rate of throughput under the influence of gravity was considerably slower, and in fact the entire body of water would not (under the influence of gravity) pass through the bed which appeared to have become clogged. For example, it took 5 seconds for the hot water to pass through roasted sample II on the first pass and on the second pass only about 15% of the water passed through under the influence of gravity, the remainder being held back by the column of coffee. Sample I was similar to sample II.

In the case of sample III, the water passed through the bed at a substantially constant rate for the first, second, and successive passes. For example, under the influence of gravity, it took about 5 seconds for the water to pass through sample III on the first pass, and it took about 5 seconds on the second pass; a fifth pass, for example, also took about 5 seconds. The bed of irradiated coffees did not become clogged.

The extract liquor withdrawn from the fifth pass of sample III, containing coffee solubles, was dried and the dry solubles were tested. A control, prepared by subjecting the liquid above the bed of coffee of sample II to sufficient pressure to force it through to give an extract having about the same concentration, was also similarly dried and tested. The flavor and taste of a coffee beverage prepared from the irradiated sample was consistently found to be superior to the non-irradiated sample by a panel of expert tasters who are skilled-in-the-art.

Another feature of this invention is the elimination of fines from the ground coffees to be extracted. This may be observed from the following: Separate aliquots of the ground coffees of samples II and III which had been passed through a Hobart grinder having affixed setting were weighed out. The samples had the same moisture content, 7.6% as measured by the Cenco Meter technique. Each sample was then subjected to a sieve analysis. In all respects, other than irradiation, the samples had been treated identically. The results of the sieve analysis are as follows:

|  | Non-Irradiated Sample II | Irradiated Sample III |
| --- | --- | --- |
| Percent retained on 8-mesh | 27.5 | 50.3 |
| Percent retained on 20-mesh | 60.4 | 47.3 |
| Percent through 20-mesh | 11.7 | 2.3 |

From this tabulation, it may be observed that the irradiated sample III had a much lower content of undesirable fines—specifically the fine content (through 20-mesh) of sample III was about 20% of that of the non-irradiated control, sample II although both had been treated identically and ground in the same grinder.

The advantages of this invention are quite rapidly observable during commercial operation of a soluble coffee extraction unit wherein as the aqueous extraction liquor passes through the deep, tall, or attenuated bed of coffee, typically 15–20 feet long, the condition of the irradiated coffee particles is such that a continuous, full, uninterrupted flow of liquor is obtained with minimum pressure drop, minimum carry-over of fines, and with maximum product of coffee of measurably superior properties. This result may be attributable, inter alia, to the unexpected finding that when coffee particles which have been irradiated are subjected to a once-through standard grinding operation, the ground coffee has a substantially smaller content of very fine particles. The amount of fines may be 75%–80% less than (i.e. only 20%–25% of) fines obtained from the grinding of unirradiated coffee beans in the same standard grinding operation. Typically the fines obtained in accordance with this process may be 2%–4% whereas with irradiated coffee, they may be 10%–15%.

CACAO BEANS 200 grams of cacao beans were divided into two equal portions. One portion was treated with $5 \times 10^6$ rep of ionizing penetrating radiation from a cobalt 60 source, while the other portion remained untreated. Both were roasted in a Proctor and Schwartz oven for twenty minutes at 284° F. They were both then ground in a mill to a small particle size and they were further ground with a mortar and pestle until each was the consistency of a smooth cream. Both samples were then refrigerated overnight and in the morning they were placed on a steam bath to liquefy them, following which they were both in a warm water bath until they were tasted. The irradiated sample was of a superior quality with respect to both aroma and chocolate flavor. In addition, the irradiated sample was considerably less astringent. Both samples were placed in storage at 70° F. for three weeks. At the end of that time it was noted that the sample which had not been irradiated displayed a large amount of bloom, that is, a crystallization of the fat present in the chocolate, on the surface, while the irradiated sample showed extremely little bloom.

It will be understood that while the invention has been described in part by means of specific examples, reference should be had to the appended claims for a definition of the scope of the invention.

What is claimed is:

1. A process for roasting beans selected from the group consisting of green coffee beans and unroasted cacao beans which comprises treating said beans with ionizing penetrating radiation at a dose of $5 \times 10^5$ rep to $9 \times 10^6$ rep and heating said beans for a time and temperature sufficient to complete roasting.

2. A process for roasting beans selected from the group consisting of green coffee beans and unroasted cacao beans which comprises treating said beans with ionizing penetrating radiation at a dose of $1 \times 10^6$ rep to $9 \times 10^6$ rep and heating said beans for a time and temperature sufficient to complete roasting.

3. A process for roasting green coffee beans which comprises treating coffee beans with ionizing penetrating radiation at a dose of $1 \times 10^6$ rep to $9 \times 10^6$ rep, and heating said coffee beans for a time and temperature sufficient to complete roasting.

4. A process for roasting green coffee beans which comprises treating green coffee beans with ionizing penetrating radiation selected from the group consisting of gamma radiation and beta radiation, in a gaseous atmosphere at a dose of $1 \times 10^6$ rep to $9 \times 10^6$ rep, and heating said coffee beans for a time and temperature sufficient to complete roasting.

5. A process for roasting coffee which comprises irradiating coffee with gamma radiation at a dose of $1 \times 10^6$ to $9 \times 10^6$ rep, and heating said coffee beans for a time and temperature sufficient to complete roasting.

6. A process for roasting coffee which comprises treating green coffee beans with beta radiation at a dose of $1 \times 10^6$ rep to $9 \times 10^6$ rep, and then heating said coffee beans for a time and temperature sufficient to complete roasting.

7. A process for roasting coffee which comprises treating green coffee beans with gamma radiation from cobalt 60 at a dose of $1 \times 10^6$ to $9 \times 10^6$ rep, and heating said coffee beans for a time and temperature sufficient to complete roasting.

8. A process for treating cacao beans which comprises treating said beans with gamma radiation at a dose of $1 \times 10^6$ rep to $9 \times 10^6$ rep, roasting said radiated cacao beans, and then grinding said roasted beans.

9. The method of extracting soluble coffee from coffee beans which comprises irradiating coffee beans with ionizing penetrating radiation at a dosage of $1 \times 10^6$ rep to $9 \times 10^6$ rep, roasting said irradiated coffee beans, grinding said irradiated roasted coffee beans to reduce the particle size thereof, passing an aqueous extract liquor through a bed of said irradiated ground coffee beans, and recovering dry soluble coffee from said extract liquor.

10. The method of extracting soluble coffee from coffee by the process as claimed in claim 9 wherein said aqueous extraction liquor is at a temperature of at least 175°–190° F.

11. The method of treating coffee beans which comprises irradiating green coffee beans with ionizing penetrating radiation at a dosage of $1 \times 10^6$ rep to $9 \times 10^6$ rep, roasting said irradiated beans to produce roasted coffee beans, grinding, said irradiated roasted coffee beans to produce a ground coffee having a particle size distribution such that at least about 40% of the particles are retained on a 20-mesh screen and less than about 4% of the particles pass through a 20-mesh screen, passing hot aqueous extract liquor through a bed of said irradiated ground coffee beans, and recovering soluble coffee from said extract liquor.

12. The method of treating coffee beans which comprises irradiating green coffee beans with ionizing penetrating radiation at a dosage of $1 \times 10^6$ rep to $9 \times 10^6$ rep, thermally roasting said irradiated beans to produce roasted coffee beans, grinding said irradiated roasted coffee beans to produce a ground coffee having a particle size distribution such that about 40% of the particles are retained on a 20-mesh screen and about 2%–4% of the particles pass through a 20-mesh screen, passing hot aqueous extract liquor through a bed of said irradiated ground coffee beans, and recovering dry soluble coffee from said extract liquor.

13. The method of treating coffee beans which are to be ground to give a product wherein at least about 40% of the particles are retained on a 20-mesh screen and a minimum amount of particles are of size sufficiently small to pass through a 20-mesh screen which comprises grinding coffee beans which have been irradiated with ionizing penetrating radiation at a dosage of $1 \times 10^6$ rep to $9 \times 10^6$ rep, thereby producing a ground coffee having a substantially smaller proportion of fines than an unirradiated coffee when subjected to the same grinding, passing hot aqueous extract liquor through a bed of said irradiated ground coffee beans, and recovering dry soluble coffee from said extract liquor.

14. In the method of treating coffee beans wherein after roasting the beans are ground under standard grinding conditions to produce a ground bean having a particle size distribution such that about 40%–60% of the grounds passes through an 8-mesh screen and is retained on a 20-mesh screen and wherein as much as 10%–15% of the ground coffee passes through a 20-mesh screen and said ground beans are then extracted with hot aqueous extraction liquor, the improvement which comprises subjecting said coffee beans to ionizing penetrating radiation at a dosage of $1 \times 10^6$ rep to $9 \times 10^6$ rep prior to completion of roasting, and grinding said irradiated coffee under the said grinding conditions to produce a ground bean containing about 2%–4% fines.

References Cited in the file of this patent

UNITED STATES PATENTS

| | | |
|---|---|---|
| 1,859,740 | Kennedy | May 24, 1932 |
| 2,292,255 | Weisberg | Aug. 4, 1942 |
| 2,341,723 | Kennedy | Feb. 15, 1944 |
| 2,489,135 | Himmel | Nov. 22, 1949 |
| 2,534,222 | Brasch | Dec. 19, 1950 |

OTHER REFERENCES

"Refrigerated Engineering," January 1953, pp. 55–57.
"Food Manufacture," June 1955, pp. 233–236.
"Food Engineering," August 1955, pp. 43–47 and 154.
"Tea and Coffee Trade Journal," October 1956, p. 9.
"Industrial Refrigeration," November 1956, pp. 15–19.